United States Patent
Karasawa

(10) Patent No.: US 8,833,335 B2
(45) Date of Patent: Sep. 16, 2014

(54) CONTROL DEVICE OF VEHICLE OIL SUPPLY DEVICE

(75) Inventor: Masahiro Karasawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/985,151

(22) PCT Filed: Feb. 15, 2011

(86) PCT No.: PCT/JP2011/053179
§ 371 (c)(1),
(2), (4) Date: Aug. 13, 2013

(87) PCT Pub. No.: WO2012/111096
PCT Pub. Date: Aug. 23, 2012

(65) Prior Publication Data
US 2013/0319366 A1  Dec. 5, 2013

(51) Int. Cl.
*F01M 1/02* (2006.01)
*F02D 29/02* (2006.01)
*F01M 1/16* (2006.01)
*F16H 61/00* (2006.01)
*F01M 1/12* (2006.01)

(52) U.S. Cl.
CPC ............. *F01M 1/02* (2013.01); *F02D 29/02* (2013.01); *F01M 2001/0215* (2013.01); *F01M 2001/123* (2013.01); *F16H 2312/14* (2013.01); *F01M 1/16* (2013.01); *F16H 61/0031* (2013.01)
USPC ............................ 123/196 R; 180/338; 477/3

(58) Field of Classification Search
CPC .. F16H 57/0439; F16H 57/0435; F01M 1/16; F01M 1/02; F01M 2250/62; F01M 2250/64; F01M 2250/66; F01M 2001/0215; F01M 2001/0223; F01M 2001/123; F02D 29/04
USPC ...... 123/196 R, 196 CP; 180/338, 339; 477/3
See application file for complete search history.

(56) References Cited

U.S. PATENT DOCUMENTS

| 6,913,558 B2 * | 7/2005 | Mori et al. ................... 477/3 |
| 7,137,924 B2 * | 11/2006 | Ito et al. ...................... 477/3 |
| 7,779,958 B2 * | 8/2010 | Kitano et al. ............... 180/339 |
| 7,946,389 B2 * | 5/2011 | Kakinami et al. ......... 184/27.2 |
| 8,433,484 B2 * | 4/2013 | Waku et al. .................. 701/51 |
| 8,572,956 B2 * | 11/2013 | Miyabe et al. ............. 60/417 |
| 2002/0107103 A1 | 8/2002 | Nakamori et al. |

(Continued)

FOREIGN PATENT DOCUMENTS

| JP | A-2000-170888 | 6/2000 |
| JP | A-2001-248468 | 9/2001 |
| JP | A-2002-206634 | 7/2002 |
| JP | A-2002-371969 | 12/2002 |

(Continued)

*Primary Examiner* — Hung Q Nguyen
(74) *Attorney, Agent, or Firm* — Oliff PLC

(57) ABSTRACT

A control device has a mechanical oil pump driven by an engine and an electric oil pump supplying oil via a check valve in an oil passage connecting the mechanical oil pump and the electric oil pump, the check valve allowing a flow of the oil from the electric oil pump side to the mechanical oil pump side while blocking a flow in an opposite direction, regardless of the pressure of the electric oil pump. When the check valve is closed under an oil pressure condition in which the electric oil pump outputs a maximum output oil pressure while the mechanical oil pump is driven by the engine at idle, the control device is configured to drive the electric oil pump during stop of the mechanical oil pump, and to stop the electric oil pump based on a load increase after start of the mechanical oil pump.

3 Claims, 9 Drawing Sheets

(56) References Cited

U.S. PATENT DOCUMENTS

2006/0065217 A1* 3/2006 Ikegawa ................. 123/41.42
2006/0070600 A1* 4/2006 Hara ..................... 123/196 R
2006/0120876 A1   6/2006 Kitano et al.
2011/0107863 A1* 5/2011 Ren et al. ................ 74/473.11
2011/0129356 A1* 6/2011 Kobayashi et al. .......... 417/44.1

FOREIGN PATENT DOCUMENTS

| JP | B2-3648411 | 5/2005 |
| JP | A-2007-232115 | 9/2007 |
| JP | B2-3997227 | 10/2007 |
| JP | B2-4085827 | 5/2008 |
| JP | B2-4124765 | 7/2008 |

* cited by examiner

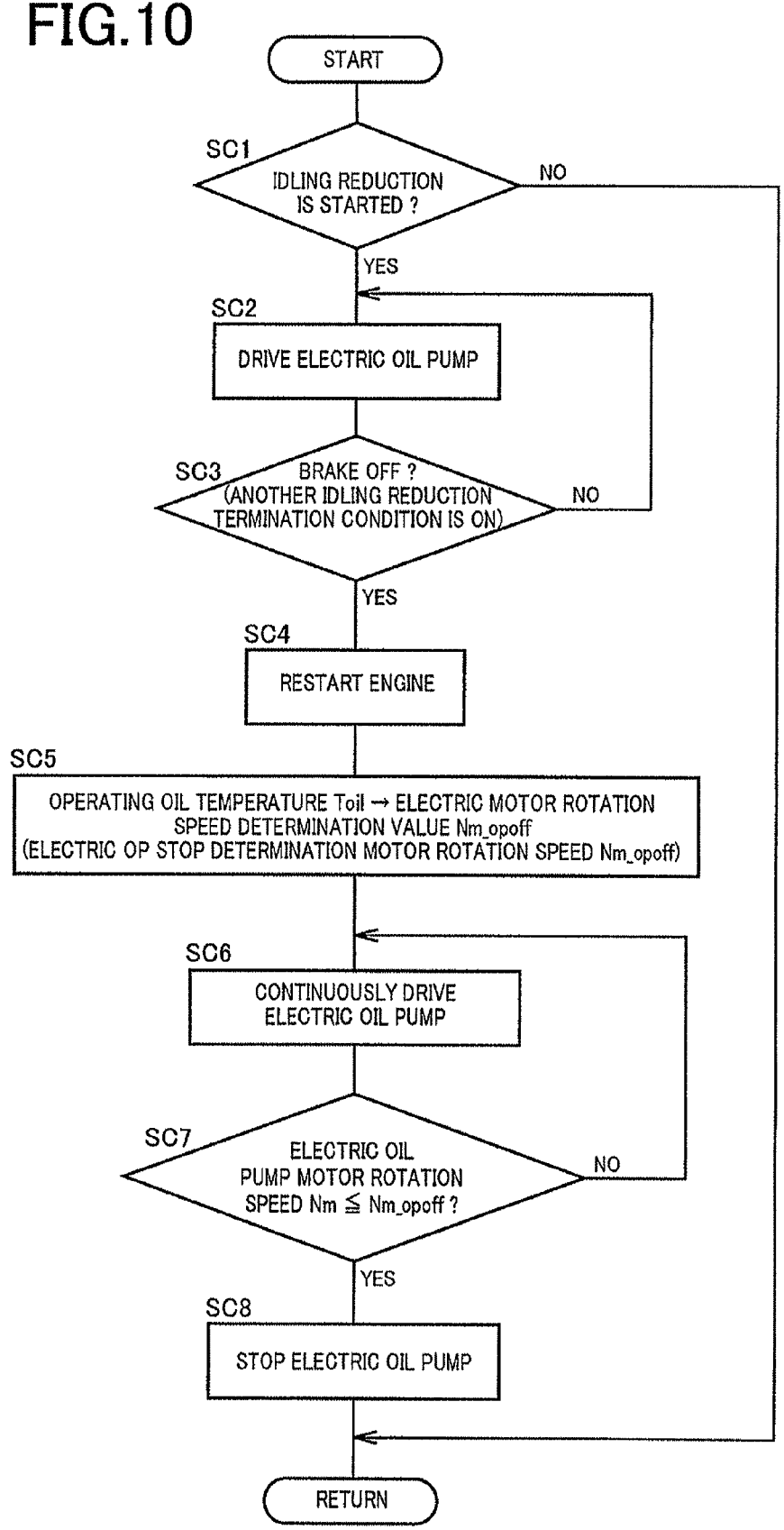

_(1)_

CONTROL DEVICE OF VEHICLE OIL SUPPLY DEVICE

TECHNICAL FIELD

The present invention relates to control for stopping an electric oil pump in a vehicle oil supply device including the electric oil pump and a mechanical oil pump.

BACKGROUND ART

A control device of a vehicle oil supply device has hitherto been known that includes an electric oil pump and a mechanical oil pump driven by an engine to supply oil to an oil supply destination. For example, this corresponds to an electric oil pump driving control device of a vehicle described in Patent Document 1. The vehicle described in Patent Document 1 provides idling reduction control for temporarily automatically stopping the engine in association with a stop of running of the vehicle. Since the mechanical oil pump is stopped as the engine stops during the idling reduction control, the electric oil pump driving control device drives the electric oil pump so as to supply oil to an automatic transmission etc. When the idling reduction control is canceled, the electric oil pump driving control device stops the electric oil pump if an engine rotation speed becomes equal to or greater than a predetermined rotation speed.

PRIOR ART DOCUMENTS

Patent Documents

Patent Document 1: Japanese Laid-Open Patent Publication No. 2001-248468
Patent Document 2: Japanese Patent Publication No. 3997227
Patent Document 3: Japanese Patent Publication No. 3648411
Patent Document 4: Japanese Patent Publication No. 4124765
Patent Document 5: Japanese Patent Publication No. 4085827

SUMMARY OF THE INVENTION

Problem to Be Solved by the Invention

The electric oil pump is driven when the mechanical oil pump cannot supply oil such as during the idling reduction control. For example, if an output oil pressure of the mechanical oil pump is equal to or greater than a steady-state output oil pressure of the electric oil pump, it is wasteful to continue driving the electric oil pump. However, since the electric oil pump driving control device of Patent Document 1 determines the timing of stopping the electric oil pump based on an engine rotation speed, the predetermined rotation speed acting as a threshold value of the engine rotation speed for stopping the electric oil pump must be set to a rotation speed at which the mechanical oil pump outputs an oil pressure sufficiently exceeding the steady-state output oil pressure of the electric oil pump so as to avoid a temporary drop in oil pressure. Therefore, at the start of driving of the mechanical oil pump, this elongates an overlap period while the mechanical oil pump and the electric oil pump are driven in an overlapping manner, and the electric oil pump is driven more than necessary. If the electric oil pump is driven more than necessary in this way, fuel efficiency may deteriorate, for example. Such a problem is not known.

The present invention was conceived in view of the situations and it is therefore an object of the present invention to provide a control device of a vehicle oil supply device to reduce a period while a mechanical oil pump and an electric oil pump are driven in an overlapping manner in the vehicle oil supply device including the mechanical oil pump and the electric oil pump.

Means for Solving the Problem

To achieve the object, the first aspect of the invention provides (a) a control device of a vehicle oil supply device having a mechanical oil pump driven by an engine to supply oil to an oil supply destination and an electric oil pump supplying oil via a check valve to the oil supply destination, the check valve making up a portion of an oil passage connecting a discharge port of the mechanical oil pump and a discharge port of the electric oil pump, the check valve allowing a flow of the oil from the electric oil pump side to the mechanical oil pump side while blocking a flow in a direction opposite to the flow, (b) the control device driving the electric oil pump during stop of the mechanical oil pump, (c) the control device stopping the electric oil pump based on a load increase of the electric oil pump after start of driving of the stopped mechanical oil pump.

Effects of the Invention

If output oil pressure of the mechanical oil pump rises at the start of driving of the mechanical oil pump, since the oil discharged from the electric oil pump is held back by the output oil pressure of the mechanical oil pump, a rise in output oil pressure of the mechanical oil pump is directly reflected by a load increase of the electric oil pump. Therefore, as described in the first aspect of the invention, while a shortage of oil supply such as a temporary drop in oil pressure is suppressed in the oil supply destination, an overlap period of driving the mechanical oil pump and the electric oil pump in an overlapping manner, i.e., a pump overlap drive period, can be made shorter as compared to the conventional technique in which the electric oil pump is stopped based on the engine rotation speed. If the pump overlap drive period is shortened, the wasteful operation of the electric oil pump is reduced, leading to improvement in fuel efficiency of the vehicle, for example. For example, the fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole. Contrarily, reduction (deterioration) in fuel efficiency refers to shortening of the running distance per unit fuel consumption or increase in fuel consumption rate of the vehicle as a whole.

The second aspect of the invention provides the control device of a vehicle oil supply device recited in the first aspect of the invention, wherein the load increase of the electric oil pump corresponds to a decrease in rotation speed of an electric motor when the electric motor driving the electric oil pump is driven by a predetermined drive current. Consequently, the load increase of the electric oil pump can easily be detected by detecting the rotation speed of the electric motor.

The third aspect of the invention provides the control device of a vehicle oil supply device recited in the first aspect of the invention, wherein the load increase of the electric oil pump corresponds to an increase in drive current of the electric motor when an electric motor driving the electric oil pump is driven at a predetermined rotation speed. Consequently, the load increase of the electric oil pump can easily be detected by detecting the drive current of the electric motor.

The fourth aspect of the invention provides the control device of a vehicle oil supply device recited in any one of the first to third aspects of the invention, wherein the check valve is closed under an oil pressure condition in which the electric oil pump outputs a maximum output oil pressure of the electric oil pump while the mechanical oil pump is driven by the engine in an idling state. Consequently, since the check valve is closed if the engine is started and put into the idling state even when the electric oil pump outputs the maximum output oil pressure, the load of the electric oil pump significantly increases as compared to when the check valve is opened. Therefore, the load increase of the electric oil pump can easily be detected. It is noted that the mechanical oil pump outputs oil pressure corresponding to an idle rotation speed of the engine in the idling state of the engine.

Preferably, if the electric motor is driven by the predetermined drive current, it is considered that the load of the electric oil pump is larger when the rotation speed of the electric motor is lower. Consequently, the load increase of the electric oil pump can be replaced with the decrease in the rotation speed of the electric motor to determine a stop of the electric oil pump based on the load increase of the electric oil pump and, thus, whether the electric oil pump is stopped based on the load increase of the electric oil pump can easily be determined by detecting the rotation speed of the electric motor.

Preferably, when the electric motor is driven by the predetermined drive current, after the start of driving of the stopped mechanical oil pump, if a decreased amount of the rotation speed of the electric motor with respect to that before the start of driving of the mechanical oil pump becomes equal to or greater than a rotation speed decreased amount determination value defined in advance, the electric oil pump is stopped. Consequently, whether the electric oil pump is stopped based on the load increase of the electric oil pump can easily be determined by detecting a change in the rotation speed of the electric motor.

Preferably, when the electric motor is driven by the predetermined drive current, after the start of driving of the stopped mechanical oil pump, if the rotation speed of the electric motor becomes equal to or less than an electric motor rotation speed determination value defined in advance, the electric oil pump is stopped. Consequently, whether the electric oil pump is stopped based on the load increase of the electric oil pump can easily be determined by detecting the rotation speed of the electric motor. Further, preferably, the electric motor rotation speed determination value is set lower when the temperature of the oil sucked by the electric oil pump is lower. Consequently, although the viscosity of the oil is increased and the load of the electric oil pump becomes larger regardless of the operation of the mechanical oil pump when the temperature of the oil is lower, the viscosity characteristic of the oil can be reflected to the electric motor rotation speed determination value to stop the electric oil pump at proper timing corresponding to the operation state of the mechanical oil pump.

Preferably, if the electric motor is driven at the predetermined rotation speed, it is considered that the load of the electric oil pump is larger when the drive current of the electric motor is greater. Consequently, the load increase of the electric oil pump can be replaced with the increase in the drive current of the electric motor to determine a stop of the electric oil pump based on the load increase of the electric oil pump and, thus, whether the electric oil pump is stopped based on the load increase of the electric oil pump can easily be determined by detecting the drive current of the electric motor.

Preferably, when the electric motor is driven at the predetermined rotation speed, after the start of driving of the stopped mechanical oil pump, if an increased amount of the drive current of the electric motor with respect to that before the start of driving of the mechanical oil pump becomes equal to or greater than a drive current increased amount determination value defined in advance, the electric oil pump is stopped. Consequently, whether the electric oil pump is stopped based on the load increase of the electric oil pump can easily be determined by detecting a change in the drive current of the electric motor.

Preferably, when an idling reduction control for temporarily automatically stopping the engine in association with a stop of running of the vehicle is canceled, the electric oil pump is stopped based on the load increase of the electric oil pump after the start of driving of the stopped mechanical oil pump. Consequently, when the idling reduction control is canceled, the pump overlap drive period can be shortened and, for example, the fuel efficiency of the vehicle can be improved.

Preferably, the maximum output oil pressure of the electric oil pump is lower than the output oil pressure the mechanical oil pump during the idling state of the engine. Consequently, if the engine is started and put into the idling state even when the electric oil pump outputs the maximum output oil pressure, the load of the electric oil pump significantly increases with respect to that before the start of driving of the mechanical oil pump. Therefore, the load increase of the electric oil pump can easily be detected.

Preferably, the output oil pressure of the mechanical oil pump during the idling state of the engine is higher than the output oil pressure of the electric oil pump when the electric oil pump is driven before the start of driving of the mechanical oil pump. Consequently, if the engine is started and put into the idling state, the load of the electric oil pump significantly increases with respect to that before the start of driving of the mechanical oil pump. Therefore, the load increase of the electric oil pump can easily be detected.

Preferably, the vehicle oil supply device supplies an oil pressure causing the operation of a plurality of friction engagement devices (clutches and brakes) engaged through hydraulic control so as to shift an automatic transmission.

Preferably, if the engine is stopped, the mechanical oil pump is also stopped and, when a rotation speed of the engine is higher, the output oil pressure of the mechanical oil pump becomes higher.

Although intake oil passages of the mechanical oil pump and the electric oil pump are coupled to each other on the way such that oil (operating oil or lubrication oil) is sucked up from a common suction port, the oil passages to separated suction ports can be disposed.

BRIEF DESCRIPTION OF THE DRAWINGS

FIG. 10 is a flowchart for explaining a main portion of the control function of the electronic control device of FIG. 1, i.e., a control operation of driving or stopping the electric oil pump in the constant drive current control and a flowchart for explaining the second embodiment.

MODE FOR CARRYING OUT THE INVENTION

An example of the present invention will now be described in detail with reference to the drawings.

Embodiment 1

Figure 1:
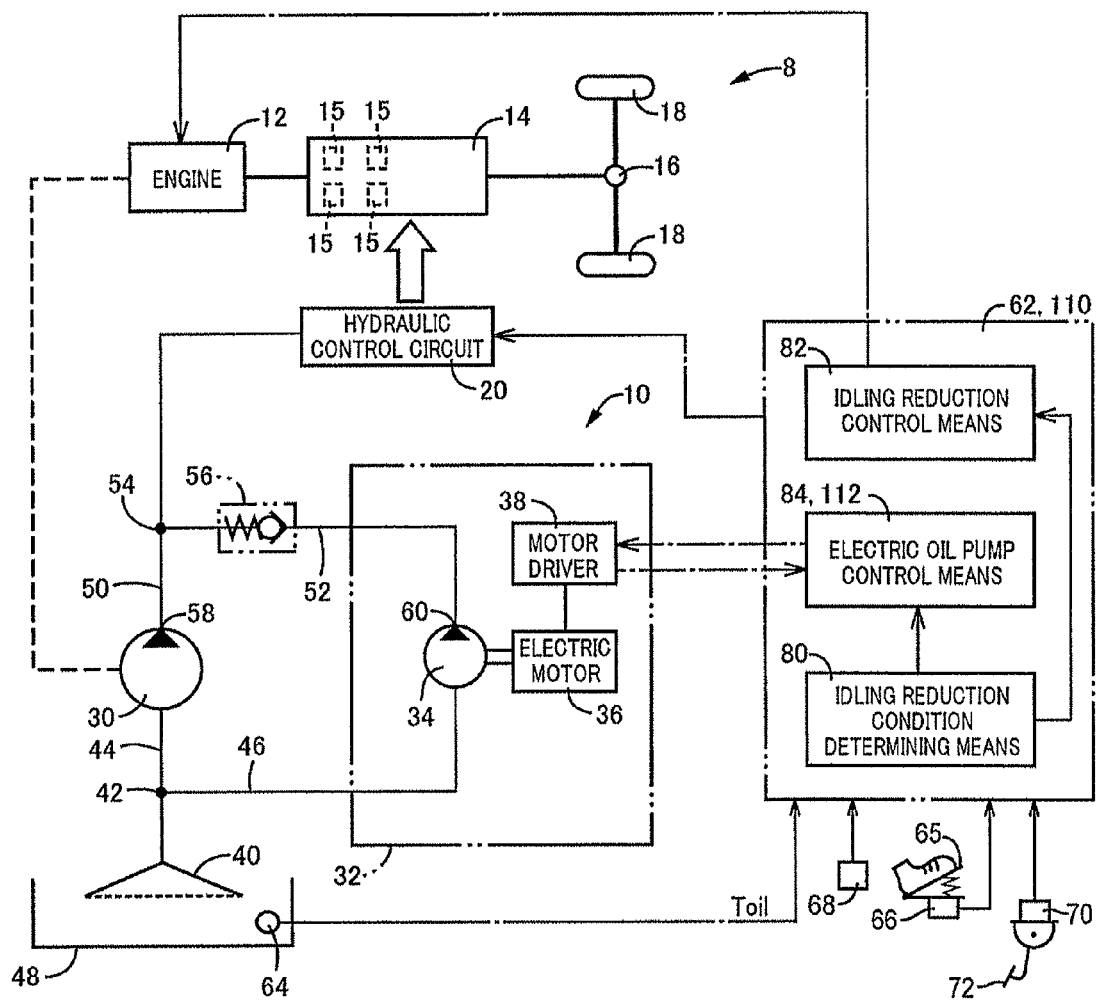
FIG. 1 is a block diagram of a outlined configuration of a vehicle including a vehicle oil supply device that is an embodiment of the present invention.

FIG. 1 is a block diagram of a outlined configuration of a vehicle 8 including a vehicle oil supply device 10 (hereinafter referred to as an oil supply device 10) that is an embodiment of the present invention. In FIG. 1, an engine 12 is an internal combustion engine such as a gasoline engine and a diesel engine and is cranked by a starter motor at the start of the engine to act as a power source for running. The output of the engine 12 is transmitted from an automatic transmission 14 via a differential gear device 16 to left and right drive wheels 18. The automatic transmission 14 corresponds to a power transmission mechanism and is a planetary gear type or a parallel shaft type stepped transmission including a plurality of friction engagement devices 15 (clutches and brakes) each engaged by a hydraulic actuator for switching a plurality of gear stages having different gear ratios. A hydraulic control circuit 20 is configured with an electromagnetic opening/closing valve, an electromagnetic pressure regulating valve, an electromagnetic switching valve, etc., and supplies an oil pressure to the predetermined hydraulic actuators to engage the corresponding friction engagement devices 15, thereby establishing a predetermined gear stage in the automatic transmission 14.

The oil supply device 10 acts as a vehicle oil pressure generation device generating an oil pressure and includes a mechanical oil pump 30, an electric oil pump 32, and a check valve 56. The mechanical oil pump 30 is mechanically coupled to the engine 12 and is mechanically rotationally driven by the engine 12 to supply oil to an oil supply destination. In other words, an oil pressure is output to the oil supply destination. Therefore, if the engine 12 is stopped, the mechanical oil pump 30 is also stopped and, when a rotation speed Ne of the engine 12 (hereinafter referred to as an engine rotation speed Ne) is higher, an output oil pressure Pmop of the mechanical oil pump 30 (hereinafter referred to as a mechanical oil pump output oil pressure Pmop) becomes higher.

The electric oil pump 32 includes a pump mechanism 34, an electric motor 36, and a motor driver 38 providing drive control of the electric motor 36 and is rotationally driven by the electric motor 36 to supply oil to the oil supply destination. In other words, an oil pressure is output to the oil supply destination. The electric oil pump 32 can be operated as needed and when needed and, for example, in the electric oil pump 32, the pump mechanism 34 is rotationally driven by the electric motor 36 at arbitrary timing for an arbitrary time period. Although a type of the electric motor 36 is not particularly limited as long as the pump mechanism 34 can rotationally be driven, the electric motor 36 is a three-phase brushless DC motor, for example. Although a rotation speed Nm of the electric motor 36 (hereinafter referred to as an electric oil pump motor rotation speed Nm) may be detected by a rotation speed detection sensor such as a resolver, a dedicated sensor for detecting the electric oil pump motor rotation speed Nm is not disposed in this embodiment, the motor driver 38 detects a counter electromotive force generated when the phases (U, V, and W phases) are switched, and a signal based on the counter electromotive force is utilized as a rotation speed pulse for detection of the electric oil pump motor rotation speed Nm.

Although a pump overlap drive period exists while the mechanical oil pump 30 and the electric oil pump 32 are driven in an overlapping manner, the mechanical oil pump 30 and the electric oil pump 32 are basically oil pumps either of which is selectively driven. The both oil pumps 30 and 32 have output oil pressure characteristics in which a mechanical oil pump output oil pressure Pmop during the idling state of the engine 12 is higher than an output oil pressure Peop of the electric oil pump 32 (hereinafter referred to as electric oil pump output oil pressure Peop) when the electric oil pump 32 is driven before the start of driving of the mechanical oil pump 30.

The mechanical oil pump 30 and the electric oil pump 32 are respectively connected to intake oil passages 44 and 46 having a common suction port (strainer) 40 and branched at a branch point 42 on the way. The mechanical oil pump 30 and the electronic oil pump 32 suck up from the suction port 40 the oil, or specifically, operating oil, flowing back to an oil pan 48 disposed in a lower portion of a transmission case to discharge the oil to discharge oil passages 50 and 52. Although the discharge oil passages 50 and 52 are coupled to each other at a coupled point 54 to supply the operating oil to the hydraulic control circuit 20, the output performance of the mechanical oil pump 30 is sufficiently greater than that of the electric oil pump 32. The discharge oil passage 52 is disposed with the check valve 56 for preventing the operating oil discharged from the mechanical oil pump 30 from flowing into the electric oil pump 32 side. Therefore, the check valve 56 makes up a portion of the oil passages 50 and 52 connecting a discharge port 58 of the mechanical oil pump 30 and a discharge port 60 of the electric oil pump 32. The check valve 56 allows a flow of the oil (operating oil) from the electric oil pump 32 side to the mechanical oil pump 30 side while blocking a flow in the direction opposite to the flow, i.e., a flow of oil from the mechanical oil pump 30 side to the electric oil pump 32 side. For example, the check valve 56 is opened when the electric oil pump output oil pressure Peop is higher than the mechanical oil pump output oil pressure Pmop. The check valve 56 preferably has characteristics causing the check valve 56 to be closed under the oil pressure condition in which the electric oil pump 32 outputs a maximum output oil pressure Peop_max of the electric oil pump 32 while the mechanical oil pump 30 is driven by the engine 12 in the idling state. The maximum output oil pressure Peop_max of the electric oil pump 32 is the maximum value of the output oil pressure Peop that can be output by the electric oil pump 32 and is defined in advance from the output oil pressure characteristics of the electric oil pump 32. The output oil pressure characteristics of the electric oil pump 32 are preferably set in advance such that the maximum output oil pressure Peop_max of the electric oil pump 32 is lower than the mechanical oil pump output oil pressure Pmop during the idling state of the engine 12. The mechanical oil pump output oil pressure Pmop during the idling state of the engine 12 is the mechanical oil pump output oil pressure Pmop output by the mechanical oil pump 30 when the engine 12 is driven at a predetermined idle rotation speed.

As can be seen from FIG. 1, the mechanical oil pump 30 and the electric oil pump 32 have the same oil pressure supply destination, i.e., the oil supply destination, and the oil supply destination is the hydraulic control circuit 20. In the oil supply device 10, the mechanical oil pump 30 supplies the oil to the hydraulic control circuit 20 without passing through the check valve 56 while the electric oil pump 32 supplies the oil to the hydraulic control circuit 20 via the check valve 56. The electric oil pump 32 does not include a relief valve relieving the oil pressure on the discharge oil passage 52 side to the intake oil passage 46 side.

The vehicle 8 having the oil supply apparatus 10 as described above includes an electronic control device 62 that is a so-called ECU (electronic control unit). The electronic control device 62 includes a microcomputer and executes predetermined signal processes in accordance with programs stored in advance in a ROM while utilizing a temporary storage function of a RAM, etc. For example, the electronic control device 62 provides output control of the engine 12 in accordance with an accelerator opening degree Acc that is an operation amount of an accelerator pedal 65 (accelerator operation amount) etc., and provides shift control of the automatic transmission 14 in accordance with the accelerator opening degree Acc, a vehicle speed V, etc. The electronic control device 62 is supplied with a signal indicative of an oil temperature Toil of the operating oil from an oil temperature sensor 64, a signal indicative of the accelerator opening degree Acc from an accelerator opening degree sensor 66, a signal indicative of the vehicle speed V from a vehicle speed sensor 68, an ON/OFF signal from an ignition switch operated by a driver for turning on (activating) or off (terminating) a control system of the vehicle 8, signal indicative of the presence of depression of a brake pedal 72 detected by a foot brake switch 70, etc. Since the electronic control device 62 rotationally drives the electric motor 36 via the motor driver 38 to provide the drive control of the electric oil pump 32 and, therefore, the electronic control device 62 outputs drive instructions including the rotation speed Nm or a stop command etc., of the electric motor 36 to the motor driver 38 while receiving information indicative of a drive state such as the rotation speed Nm and a drive current Im of the electric motor 36 from the motor driver 38.

A main portion of the control function included in the electronic control device 62 will be described. As depicted in FIG. 1, the electronic control device 62 includes an idling reduction condition determining means 80 as an idling reduction condition determining portion, an idling reduction control means 82 as an idling reduction control portion, and an electric oil pump control means 84 as an electric oil pump control portion.

The idling reduction condition determining means 80 determines whether an idling reduction execution condition is fulfilled that is a predefined condition of provision of idling reduction control for temporarily automatically stopping the engine 12 in association with a stop of running of the vehicle 8. For example, the idling reduction execution condition is made up of conditions that (i) ignition is turned on, that (ii) the vehicle speed V detected by the vehicle speed sensor 68 is zero or equal to or less than a predetermined vehicle speed considered as substantially zero, that (iii) the brake pedal 72 is depressed (operated), i.e., brake-on is achieved, and that (iv) the accelerator opening degree Acc is zero, and the idling reduction execution condition is achieved if all the individual conditions (i) to (iv) are satisfied. On the other hand, the idling reduction execution condition is not fulfilled if any one of the individual conditions (i) to (iv) is not satisfied. For example, during the idling reduction execution condition is fulfilled, if the brake-on is changed to brake-off due to release of the brake pedal 72, i.e., if the braking operation of the vehicle 8 is canceled, the condition (iii) is no longer satisfied and, therefore, the idling reduction execution condition being fulfilled is no longer fulfilled.

If the idling reduction condition determining means 80 determines that the idling reduction execution condition is fulfilled, the idling reduction control means 82 provides the idling reduction control while if the idling reduction condition determining means 80 determines that the idling reduction execution condition is not fulfilled, the idling reduction control means 82 terminates, i.e., cancels, the idling reduction control and cranks the engine 12 with the starter motor to start the engine. Therefore, the idling reduction control means 82 stops engine 12 while the idling reduction execution condition is fulfilled, and starts the engine 12 if the idling reduction execution condition being fulfilled is no longer fulfilled. In this embodiment, the start time point of the idling reduction control is a time point when the unfulfilled idling reduction execution condition is fulfilled and the end time point of the idling reduction control is a time point when the idling reduction execution condition is no longer fulfilled and the start of the engine is completed by entering the complete explosion state etc., of the engine 12.

If the idling reduction control is started, i.e., if the idling reduction condition determining means 80 determines that the idling reduction execution condition is fulfilled, the electric oil pump control means 84 drives the electric motor 36 via the motor driver 38, thereby driving the electric oil pump 32. A purpose of the driving of the electric oil pump 32 is to supply an oil pressure from the electric oil pump 32 to the hydraulic control circuit 20 instead of the mechanical oil pump 30 since the mechanical oil pump 30 is stopped as the engine 12 stops during the idling reduction control. In other words, the electric oil pump control means 84 drives the electric oil pump 32 so as not to drop the supply oil pressure to the hydraulic control circuit 20 when the mechanical oil pump 30 is stopped.

During the engine stop due to the idling reduction control i.e., while the mechanical oil pump 30 is stopped, the electric oil pump control means 84 continuously drives the electric oil pump 32. If the idling reduction execution condition being fulfilled is no longer fulfilled, since the idling reduction control is canceled and the mechanical oil pump 30 starts to be driven, the electric oil pump 32 is stopped based on a load increase of the electric oil pump 32 after the start of driving of the stopped mechanical oil pump 30. In short, when the idling reduction control is canceled, the electric oil pump control means 84 provides electric oil pump stop control for stopping the electric oil pump 32 based on a load increase of the electric oil pump 32 after the start of driving of the stopped mechanical oil pump 30. The load of the electric oil pump 32, i.e., the load of the electric motor 36 becomes greater as the mechanical oil pump output oil pressure Pmop is made higher by driving the mechanical oil pump 30 since the check valve 56 acts so as to hold back the discharge of the operating oil from the electric oil pump 32.

Figure 2:
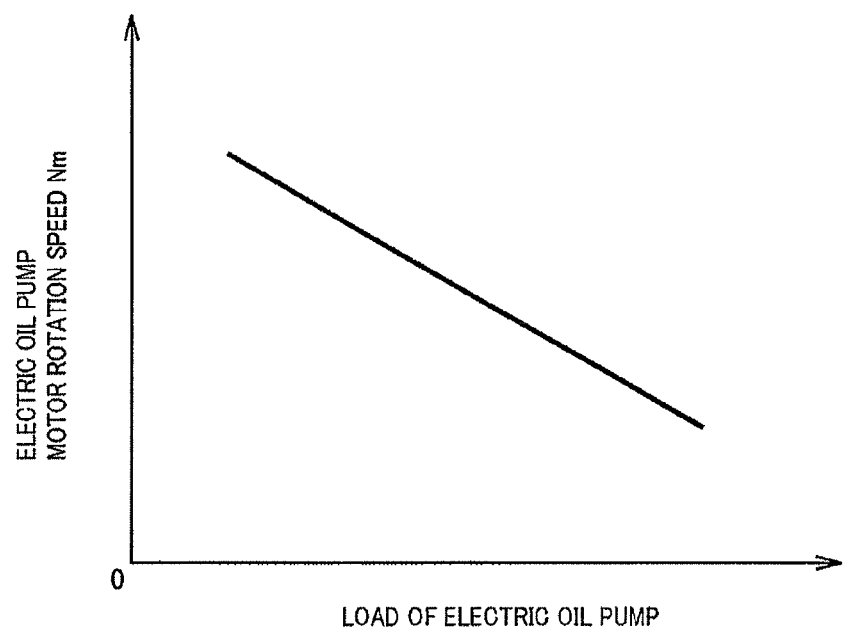
FIG. 2 is a schematic view of a relation between an electric oil pump motor rotation speed and a load of an electric oil pump when an electric motor is driven such that the drive current of the electric motor for driving the electric oil pump of FIG. 1 is maintained constant.
Figure 3:
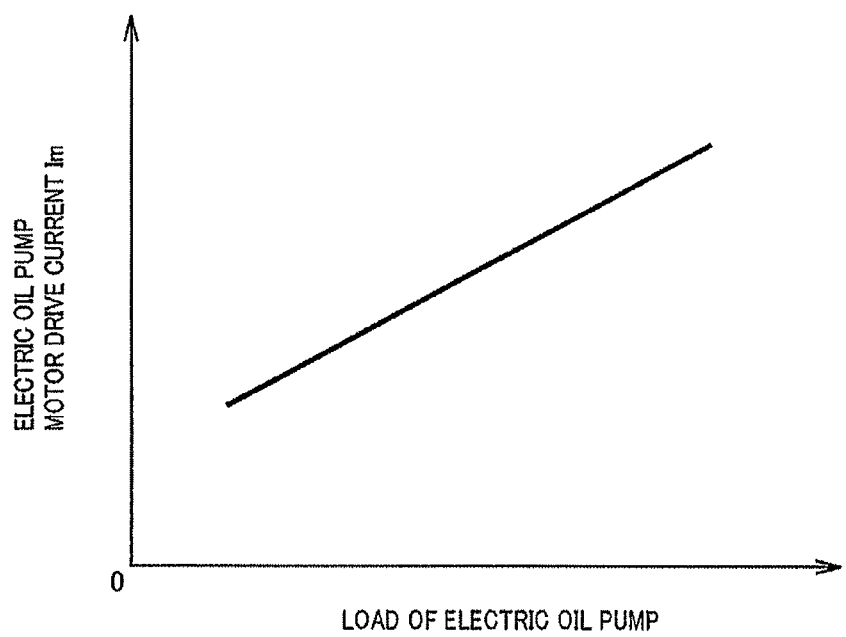
FIG. 3 is a schematic view of a relation between an electric oil pump motor drive current and the load of the electric oil pump when the electric motor is driven such that the rotation speed of the electric motor for driving the electric oil pump of FIG. 1 is maintained constant.

The load of the electric oil pump 32 is closely correlated with the electric oil pump motor rotation speed Nm or the drive current Im of the electric motor 36 (hereinafter an electric oil pump motor drive current Im). In particular, as depicted in FIG. 2, it can be said that the load increase of the electric oil pump 32 corresponds to a decrease in the electric oil pump motor rotation speed Nm when the electric motor 36 is driven by a predetermined drive current Imt or, as depicted in FIG. 3, it can be said that the load increase of the electric oil pump 32 corresponds to an increase in the electric oil pump motor drive current Im when the electric motor 36 is driven at a predetermined rotation speed Nmt. Therefore, for example, if the electric motor 36 is driven by the predetermined drive current Imt, the electric oil pump control means 84 can consider that when the electric oil pump rotation speed Nm is lower, the load of the electric oil pump 32 is greater, as depicted in FIG. 2. Alternatively, if the electric motor 36 is driven at the predetermined rotation speed Nmt, the electric oil pump control means 84 can consider that when the electric oil pump motor drive current Im is greater, the load of the electric oil pump 32 is greater, as depicted in FIG. 3. In this embodiment, the electric oil pump control means 84 drives the electric motor 36 with the predetermined drive current Imt that is a target value empirically set in advance, for example, so as to prevent a shortage of the engagement force of the friction engagement devices 15 of the automatic transmission 14 while suppressing the electric power consumption of the electric motor 36 as far as possible, i.e., through constant drive current control that makes the electric oil pump motor drive current Im constant, and therefore, the electric oil pump control means 84 considers that the load of the electric oil pump 32 is increased when the electric oil pump motor rotation speed Nm is lowered, and stops the electric oil pump 32 based on the load increase of the electric oil pump 32.

Specifically, the electric oil pump control means 84 detects the electric oil pump motor rotation speed Nm so as to determine whether the electric oil pump 32 is stopped based on a load increase of the electric oil pump 32. When the idling reduction control is canceled, i.e., at the start of driving of the mechanical oil pump 30, the electric oil pump control means 84 also determines whether a decreased amount ΔNm of the electric oil pump motor rotation speed Nm relative to before the start of driving of the mechanical oil pump 30 (hereinafter referred to as an electric oil pump motor rotation speed decreased amount ΔNm) becomes equal to or greater than a predefined rotation speed decreased amount determination value ΔNm_opoff (see FIG. 8). After the start of driving of the stopped mechanical oil pump 30, if the electric oil pump control means 84 determines that the electric oil pump motor rotation speed decreased amount ΔNm becomes equal to or greater than the rotation speed decreased amount determination value ΔNm_opoff, the electric oil pump control means 84 stops the electric oil pump 32. The rotation speed decreased amount determination value ΔNm_opoff is empirically obtained and set in advance such that the pump overlap drive period is shortened at the start of driving of the mechanical oil pump 30 and that a temporary drop due to the switch between the driven oil pumps 30 and 32 can be suppressed in the supply oil pressure to the hydraulic control circuit 20, and is a constant value, for example.

Although the electric oil pump control means 84 drives the electric motor 36 through the constant drive current control as described above in this embodiment, the electric oil pump control means 84 may drive the electric motor 36 at the predetermined rotation speed Nmt, i.e., through constant rotation speed control that makes the electric oil pump motor rotation speed Nm constant. If the electric motor 36 is controlled through the constant rotation speed control as described above, the electric oil pump control means 84 considers that the load of the electric oil pump 32 is greater when the electric oil pump motor drive current Im is greater, and stops the electric oil pump 32 based on a load increase of the electric oil pump 32. Specifically, the electric oil pump control means 84 detects the electric oil pump motor drive current Im and, at the start of driving of the mechanical oil pump 30, determines whether an increased amount ΔIm of the electric oil pump motor drive current Im relative to before the start of driving of the mechanical oil pump 30 (hereinafter referred to as an electric oil pump motor drive current increased amount ΔIm) becomes equal to or greater than a predefined drive current increased amount determination value ΔIm_opoff. After the start of driving of the stopped mechanical oil pump 30, if the electric oil pump motor drive current increased amount ΔIm becomes equal to or greater than the drive current increased amount determination value ΔIm_opoff, the electric oil pump control means 84 stops the electric oil pump 32. The drive current increased amount determination value ΔIm_opoff is empirically obtained and set in advance such that the pump overlap drive period is shortened and that a temporary drop due to the switch between the driven oil pumps 30 and 32 can be suppressed in the supply oil pressure to the hydraulic control circuit 20, and is a constant value, for example. The predetermined rotation speed Nmt of the electric motor 36 used as a target in the constant rotation speed control is empirically set in advance, for example, so as to prevent a shortage of the engagement force of the friction engagement devices 15 of the automatic transmission 14 while suppressing the electric power consumption of the electric motor 36 as far as possible.

Figure 4:
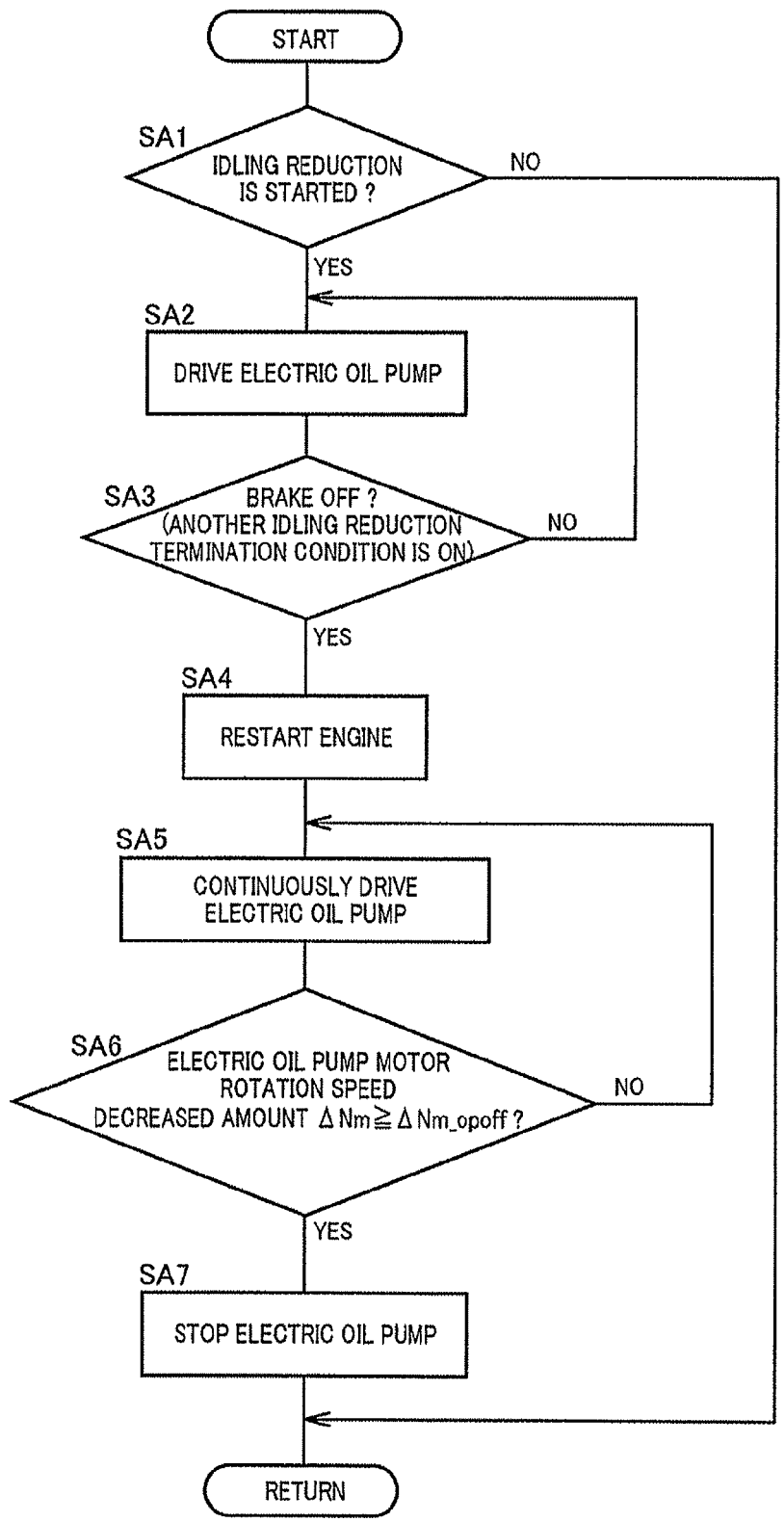
FIG. 4 is a flowchart for explaining a main portion of the control function of an electronic control device of FIG. 1, i.e., a control operation of driving or stopping the electric oil pump in a constant drive current control and a flowchart for explaining a first embodiment.

FIG. 4 is a flowchart for explaining a main portion of the control function of the electronic control device 62, i.e., a control operation of driving or stopping the electric oil pump 32 in the constant drive current control. The control operation depicted in FIG. 4 is performed independently or concurrently with another control operation.

At step (hereinafter, "step" will be omitted) SA1, it is determined whether the idling reduction control is started. Specifically, at SA1, if the idling reduction condition determining means 80 determines that the idling reduction execution condition is fulfilled, it is determined that the idling reduction control is started. If the determination of SA1 is affirmative, i.e., if the idling reduction control is started, the operation goes to SA2. On the other hand, if the determination of SA1 is negative, the flowchart is terminated.

At SA2 corresponding to the electric oil pump control means 84, the electric motor 36 included in the electric oil pump 32 is driven via the motor driver 38. Therefore, the electric oil pump 32 is driven. To suppress the temporary drop in the supply oil pressure to the hydraulic control circuit 20, for example, the driving of the electric oil pump 32 is started after the idling reduction execution condition is fulfilled and before the mechanical oil pump 30 is stopped. After SA2, the operation goes to SA3.

At SA3 corresponding to the idling reduction condition determining means 80, it is determined whether the idling reduction execution condition is no longer fulfilled. For example, if the operation state of the brake pedal 72 is changed from the brake-on (brake ON) to the brake-off (brake OFF), the idling reduction execution condition being fulfilled is no longer fulfilled. If the determination of SA3 is affirmative, i.e., the idling reduction execution condition is no longer fulfilled, the operation goes to SA4. On the other hand, if the determination of SA3 is negative, the operation goes to SA2. Therefore, the electric oil pump 32 is continuously driven at SA2 until the idling reduction execution condition is no longer fulfilled. If another idling reduction termination condition for terminating the idling reduction control exists other than the unfulfilled idling reduction execution condition, the determination of SA3 is affirmed on the condition that the another idling reduction termination condition is fulfilled, i.e., is in the ON-state.

At SA4 corresponding to the idling reduction control means 82, the engine 12 is cranked by the starter motor to restart the engine 12. Since the mechanical oil pump 30 is rotationally driven by the engine 12, the mechanical oil pump output oil pressure Pmop rises as the engine rotation speed Ne rises. As the mechanical oil pump output oil pressure Pmop rises, the check valve 56 is operated in the closing direction and the electric oil pump motor rotation speed Nm decreases as the load of the electric oil pump 32 increases. For example, if the mechanical oil pump output oil pressure Pmop increases greater than the electric oil pump output oil pressure Peop before the restart of the engine 12, a shortage of the supply oil pressure to the hydraulic control circuit 20 does not occur even when the electric oil pump 32 is stopped and, therefore, the driving of the electric oil pump 32 becomes unnecessary. After SA4, the operation goes to SA5.

At SA5 corresponding to the electric oil pump control means 84, the electric oil pump 32 is continuously driven. After SA5, the operation goes to SA6.

At SA6 corresponding to the electric oil pump control means 84, it is determined whether the electric oil pump motor rotation speed decreased amount ΔNm becomes equal to or greater than the rotation speed decreased amount determination value ΔNm_opoff. If the determination of SA6 is affirmative, i.e., if the electric oil pump motor rotation speed decreased amount ΔNm becomes equal to or greater than the rotation speed decreased amount determination value ΔNm_opoff, the operation goes to SA7. On the other hand, if the determination of SA6 is negative, the operation goes to SA5. Therefore, until the electric oil pump motor rotation speed decreased amount ΔNm becomes equal to or greater than the rotation speed decreased amount determination value ΔNm_opoff, the electric oil pump 32 is continuously driven at SA5. Although the electric oil pump motor rotation speed decreased amount ΔNm is a decreased amount of the electric oil pump motor rotation speed Nm based on the time before the start of driving of the mechanical oil pump 30 as described above, the time before the start of driving of the mechanical oil pump 30 used as a reference is preferably the time when the idling reduction execution condition being fulfilled is no longer fulfilled, for example, or may be the time of start of driving of the mechanical oil pump 30 (e.g., time tB1 of FIG. 8).

At SA7 corresponding to the electric oil pump control means 84, the electric oil pump motor drive current Im is set to zero, thereby stopping the electric motor 36. In short, the electric oil pump 32 is actively stopped.

Figure 5:
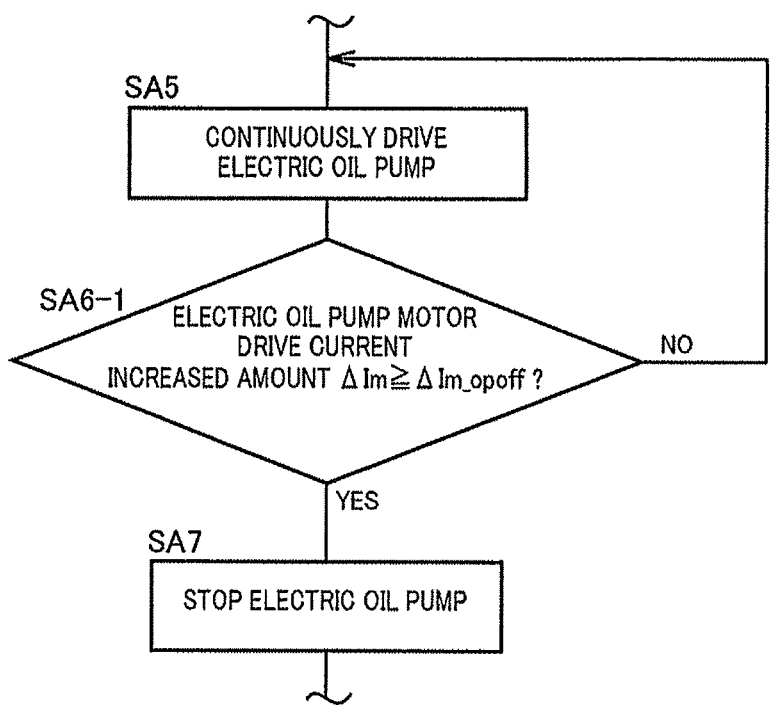
FIG. 5 is a diagram of an excerpt of steps different from FIG. 4 from a flowchart corresponding to but different from FIG. 4, i.e., a flowchart for explaining a control operation of driving or stopping the electric oil pump in a constant rotation speed control.

Although the electric motor 36 is driven through the constant drive current control in this embodiment and FIG. 4 is the flowchart for explaining the main portion of the control operation on the premise that the electric motor 36 is driven through the constant drive current control, the electric motor 36 may be drive through the constant rotation speed control, and a main portion of the control operation in the case of driving the electric motor 36 through the constant rotation speed control will be described with reference to FIG. 5. FIG. 5 is a diagram of an excerpt of steps different from FIG. 4 from a flowchart corresponding to but different from FIG. 4, i.e., a flowchart for explaining a control operation of driving or stopping the electric oil pump 32 in the constant rotation speed control. As can be seen from comparison between FIGS. 4 and 5, in FIG. 5, SA6 of FIG. 4 is replaced with SA6-1. The steps in the flowchart depicted in FIG. 5 other than SA6-1 are the same as those of FIG. 4 and therefore will not be described.

In FIG. 5, after SA5, the operation goes to SA6-1. At SA6-1, it is determined whether the electric oil pump motor drive current increased amount ΔIm becomes equal to or greater than the drive current increased amount determination value ΔIm_opoff. If the determination of SA6-1 is affirmative, i.e., if the electric oil pump motor drive current increased amount ΔIm becomes equal to or greater than the drive current increased amount determination value ΔIm_opoff, the operation goes to SA7. On the other hand, if the determination of SA6-1 is negative, the operation goes to SA5. Therefore, until the electric oil pump motor drive current increased amount ΔIm becomes equal to or greater than the drive current increased amount determination value ΔIm_opoff, the electric oil pump 32 is continuously driven at SA5. In FIG. 5, SA6-1 corresponds to the electric oil pump control means 84. Although the electric oil pump motor drive current increased amount ΔIm is an increased amount of the electric oil pump motor drive current Im based on the time before the start of driving of the mechanical oil pump 30 as described above, the time before the start of driving of the mechanical oil pump 30 used as a reference is preferably the time when the idling reduction execution condition being fulfilled is no longer fulfilled, for example, or may be the time of start of driving of the mechanical oil pump 30.

Figure 6:
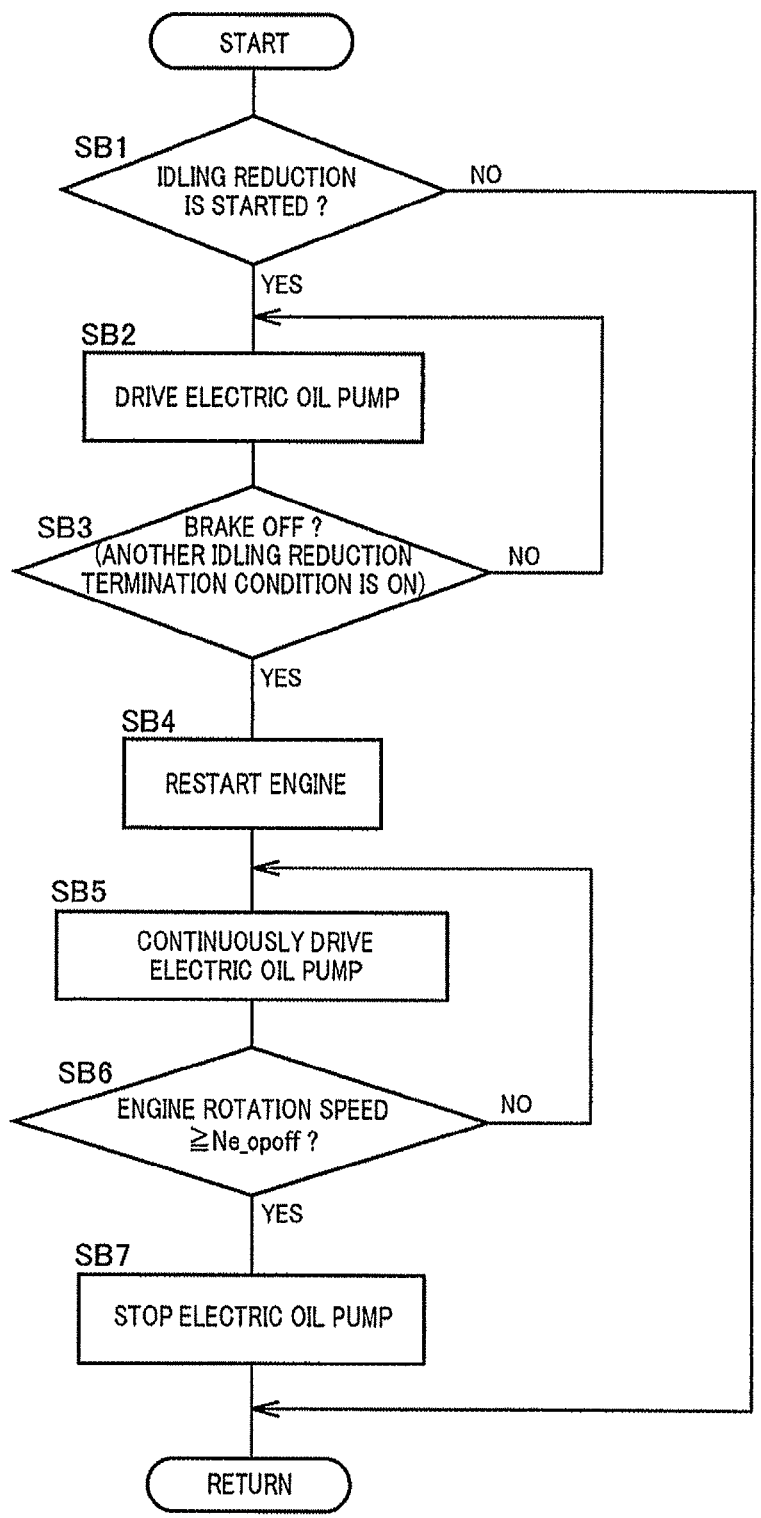
FIG. 6 is a flowchart of the conventional technique compared with FIG. 4 and is a flowchart for explaining a main portion of the control function of the conventional technique, i.e., a control operation of stopping the electric oil pump based on the engine rotation speed when the idling reduction control is canceled.
Figure 7:
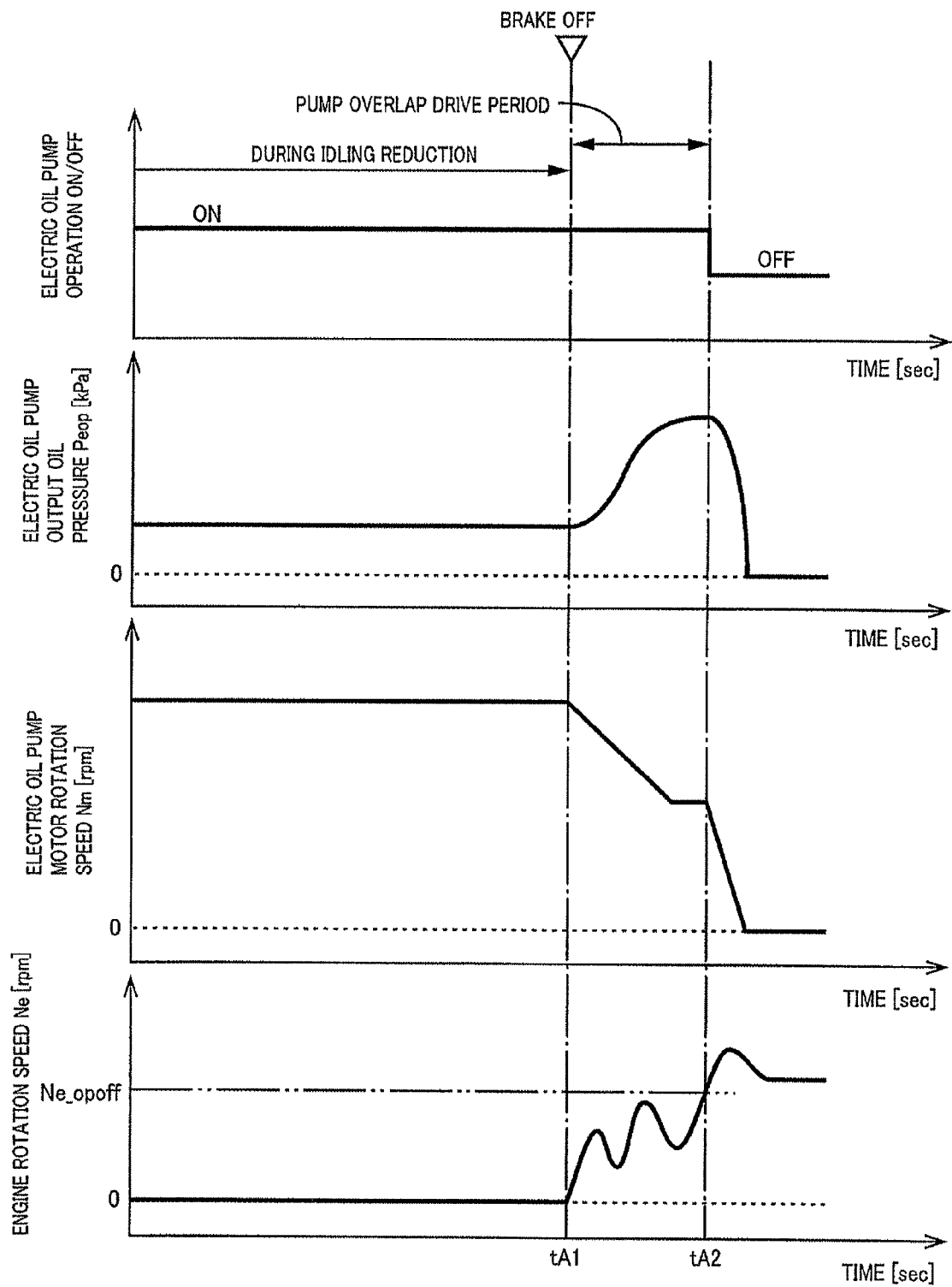
FIG. 7 is a time chart of the conventional technique for explaining the control operation of FIG. 6 taking the time of cancelation (termination) of the idling reduction control as an example.

For comparison with this embodiment, a main portion of control operation of a conventional technique will be described with reference to FIGS. 6 and 7. FIG. 6 is a flowchart compared with FIG. 4 and is a flowchart for explaining a main portion of the control function of the conventional technique, i.e., a control operation of stopping the electric oil pump 32 based on the engine rotation speed Ne when the idling reduction control is canceled. FIG. 7 is a time chart of the conventional technique for explaining the control operation of FIG. 6 taking the time of cancelation (termination) of the idling reduction control as an example. In FIG. 6, SB1 to SB5 and SB7 are the same as the SA1 to SA5 and SA7, respectively, of FIG. 4 and only SB6 of FIG. 6 is different from SA6 of FIG. 4. Therefore, SB6 of the flowchart depicted in FIG. 6 will be described and the other steps will not be described. Although a relief valve is disposed that relieves oil pressure to the intake oil passage 46 side if the oil pressure in the discharge oil passage 52 becomes equal to or greater than a predetermined value from the viewpoint of protection of the electric oil pump 32 in the conventional technique, since the electric oil pump 32 is stopped based on a load increase of the electric oil pump 32 in this embodiment, the electric oil pump 32 can be protected without disposing the relief valve and the oil supply device 10 of this example does not include such a relief valve, as described in FIG. 1.

In FIG. 6, after SB5, the operation goes to SB6. At SB6, it is determined whether the engine rotation speed Ne becomes equal to or greater than a predefined engine rotation speed determination value Ne_opoff. If the determination of SB6 is affirmative, i.e., if the engine rotation speed Ne becomes equal to or greater than the engine rotation speed determination value Ne_opoff, the operation goes to SB7. On the other hand, if the determination of SB6 is negative, the operation goes to SB5. Therefore, until the engine rotation speed Ne becomes equal to or greater than the engine rotation speed determination value Ne_opoff, the electric oil pump 32 is continuously driven at SB5. The engine rotation speed determination value Ne_opoff is set equal to or greater than the engine rotation speed Ne causing the complete explosion state of the engine 12 and is empirically obtained and set in advance such that the pump overlap drive period is shortened at the start of driving of the mechanical oil pump 30 and that a temporary drop due to the switch between the driven oil pumps can be suppressed in the supply oil pressure to the hydraulic control circuit 20. However, since the engine rotation speed Ne is less correlated with the supply oil pressure to the hydraulic control circuit 20 as compared to the load of the electric oil pump 32, the engine rotation speed determination value Ne_opoff is set with a margin so as not to cause a temporary drop in the supply oil pressure to the hydraulic control circuit 20. In other words, the timing of stopping the electric oil pump 32 in the control operation of FIG. 6 is later than the timing of stopping the electric oil pump 32 in the control operation of FIG. 4 or 5.

In FIG. 7, at time tA1, the operation state of the brake pedal 72 is changed from brake-on to brake-off. Therefore, the determination of SB3 of FIG. 6 is affirmative at time tA1 and the engine 12 is restarted at SB4. In other words, after the idling of the engine 12 is halted (stopped) until time tA1, the engine 12 is cranked from time tA1 and the engine rotation speed Ne starts rising. Since the mechanical oil pump 30 is rotationally driven by the engine 12, the mechanical oil pump output oil pressure Pmop rises as the engine rotation speed Ne rises. Therefore, from time tA1, as the mechanical oil pump output oil pressure Pmop rises, i.e., as the engine rotation speed Ne rises, the check valve 56 is operated in the closing direction and the electric oil pump output oil pressure Peop indicative of the load of the electric oil pump 32 increases while the electric oil pump motor rotation speed Nm decreases.

At time tA2, the engine rotation speed Ne reaches the engine rotation speed determination value Ne_opoff. Therefore, the determination of SB6 of FIG. 6 is affirmative at time tA2, and the electric oil pump 32 is switched from the ON-state (ON) to the OFF-state (OFF) at SB7.

Figure 8:
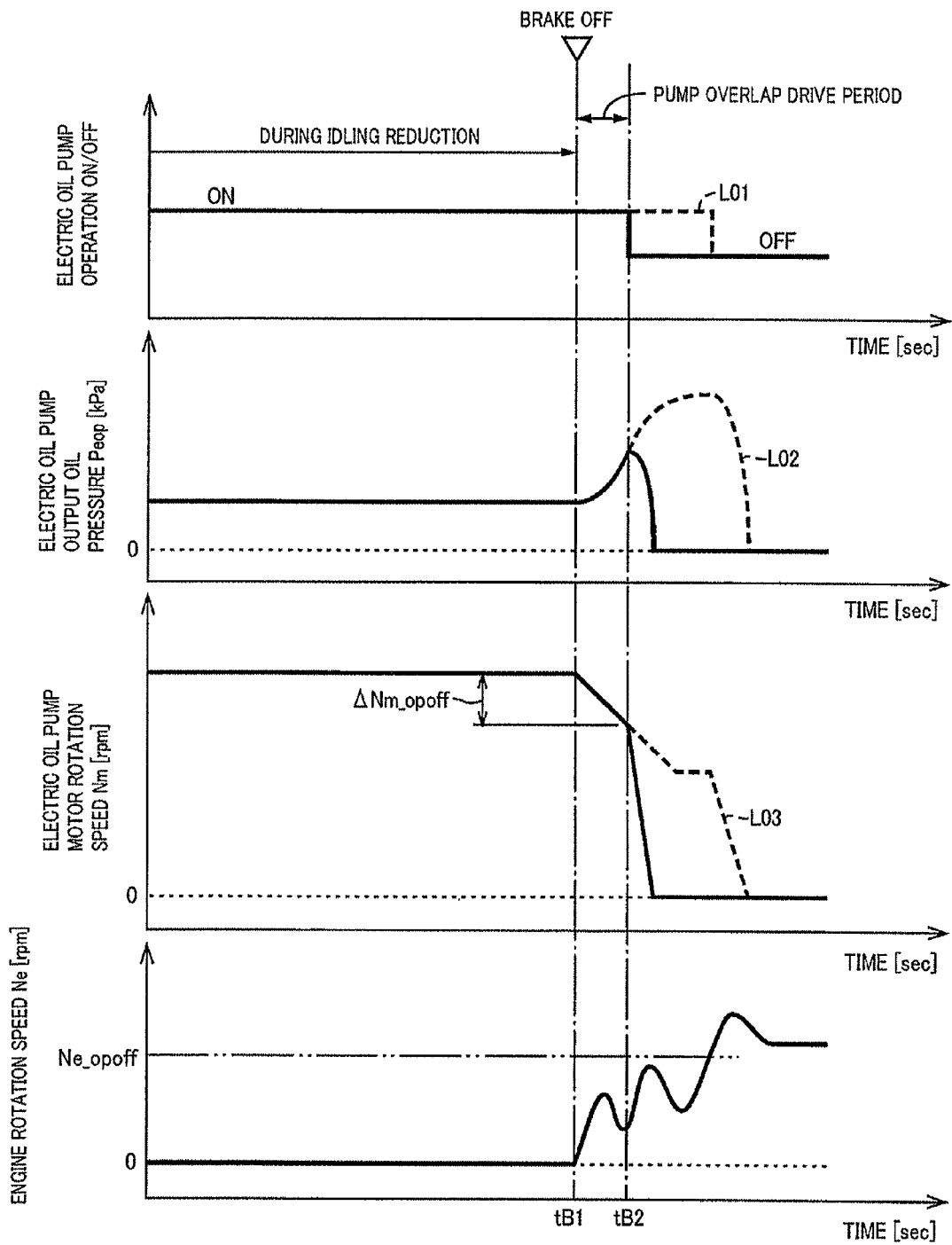
FIG. 8 is a time chart for explaining the control operation of FIG. 4 taking the time of cancelation of the idling reduction control as an example and a time chart for explaining the first embodiment.

Returning to the description of this embodiment, FIG. 8 is a time chart for explaining the control operation of FIG. 4 taking the time of cancelation of the idling reduction control as an example. The time chart of the engine rotation speed Ne of FIG. 8 is the same as that of FIG. 7, and the time charts of the operation (ON or OFF) of the electric oil pump 32, the electric oil pump output oil pressure Peop, and the electric oil pump motor rotation speed Nm are the same as the respective time charts of FIG. 7 until time tB2. Therefore, since time tB1 of FIG. 8 is the same as time tA1 of FIG. 7 and the contents of the description are the same as those of FIG. 7 before time tB2, the control operation after time tB2 will be described. For comparison with FIG. 7, the time charts of FIG. 7 are transcribed as broken lines L01, L02, and L03 in FIG. 8.

At time tB2 of FIG. 8, the electric oil pump motor rotation speed decreased amount ΔNm becomes equal to or greater than the rotation speed decreased amount determination value ΔNm_opoff. Therefore, the determination of SA6 of FIG. 4 is affirmative at time tB2 and the electric oil pump 32 is switched from the ON-state (ON) to the OFF-state (OFF) at SA7. In this embodiment, as can be seen from comparison between FIGS. 7 and 8, time tB2 is a time point earlier than time tA2 of FIG. 7, and the pump overlap drive period (time tB1 to time tB2) of FIG. 8 is shorter than the pump overlap drive period (time tA1 to time tA2) of FIG. 7.

This example has the following effects (A1) to (A9). (A1) According to this embodiment, the electric oil pump control means 84 drives the electric oil pump 32 during stop of the mechanical oil pump 30 and stops the electric oil pump 32 based on a load increase of the electric oil pump 32 after the start of driving of the stopped mechanical oil pump 30. If the mechanical oil pump output oil pressure Pmop rises at the start of driving of the mechanical oil pump 30, since the operating oil (oil) discharged from the electric oil pump 32 is held back via the check valve 56 by the mechanical oil pump output oil pressure Pmop, a rise in output oil pressure of the mechanical oil pump 30 is directly reflected by a load increase of the electric oil pump 32. Therefore, while a shortage of oil supply such as a temporary drop in oil pressure is suppressed in the hydraulic control circuit 20 that is the oil supply destination, an overlap period of driving the mechanical oil pump 30 and the electric oil pump 32 in an overlapping manner, i.e., the pump overlap drive period, can be made shorter as compared to the conventional technique described with reference to FIGS. 6 and 7. If the pump overlap drive period is shortened, the wasteful operation of the electric oil pump 32 is reduced, leading to improvement in fuel efficiency of the vehicle 8, for example. Since the electric oil pump 32 is stopped based on a load increase of the electric oil pump 32, this facilitates the avoidance of durability deterioration of the electric oil pump 32 due to a larger load of the electric oil pump 32 and, therefore, while the conventional technique requires the relief valve relieving the oil pressure in the discharge oil passage 52 to the intake oil passage 46 side, the oil supply apparatus 10 of this embodiment does not require the relief valve and the reduction in size and cost of the oil supply apparatus 10 is facilitated. It is conceivable that if a line pressure detection sensor detecting a line pressure, i.e., the supply oil pressure to the hydraulic control circuit 20, is disposed, it can be determined whether the electric oil pump 32 is stopped based on the line pressure; however, this embodiment is advantageous in that such a line pressure detection sensor is not necessary for determining whether the electric oil pump 32 is stopped. If it is determined whether the electric oil pump 32 is stopped based on the line pressure detected by the line pressure detection sensor, since variations of a detection value due to the accuracy and the temperature characteristics of the line pressure detection sensor have a large effect and a standby oil pressure during the idling reduction control is lower as compared to during running of a vehicle, it is assumed that the line pressure detection sensor is disadvantageously required to have higher accuracy; however, this embodiment does not have such a disadvantage.

(A2) According to this embodiment, the check valve 56 is preferably closed under the oil pressure condition in which the electric oil pump 32 outputs the maximum output oil pressure Peop_max of the electric oil pump 32 while the mechanical oil pump 30 is driven by the engine 12 in the idling state and, since this causes the check valve 56 to be closed if the engine 12 is started and put into the idling state even when the electric oil pump 32 outputs the maximum output oil pressure Peop_max, the load of the electric oil pump 32 significantly increases as compared to when the check valve 56 is opened. Therefore, the load increase of the electric oil pump 32 can easily be detected and, for example, the continuous driving of the electric oil pump 32 can be avoided in the idling state of the engine 12.

(A3) According to this embodiment, since the load increase of the electric oil pump 32 corresponds to a decrease in the rotation speed of the electric motor 36 when the electric motor 36 driving the electric oil pump 32 is driven by the predetermined drive current Imt, the load increase of the electric oil pump 32 can easily be detected by detecting the electric oil pump motor rotation speed Nm.

(A4) According to this embodiment, the load increase of the electric oil pump 32 may correspond to an increase in the drive current of the electric motor 36 when the electric motor 36 driving the electric oil pump 32 is driven at the predetermined rotation speed Nmt and, in this case, the load increase of the electric oil pump 32 can easily be detected by detecting the electric oil pump motor drive current Im.

(A5) According to this embodiment, if the electric motor 36 is driven by the predetermined drive current Imt, the electric oil pump control means 84 considers that the load of the electric oil pump 32 is larger when the electric oil pump motor rotation speed Nm is lower as depicted in FIG. 2. Therefore, the load increase of the electric oil pump 32 can be replaced with the decrease in the electric oil pump motor rotation speed Nm to determine a stop of the electric oil pump 32 based on the load increase of the electric oil pump 32 and, thus, whether the electric oil pump 32 is stopped based on the load increase of the electric oil pump 32 can easily be determined by detecting the electric oil pump motor rotation speed Nm.

(A6) According to this embodiment, when the electric motor 36 is driven by the predetermined drive current Imt, after the start of driving of the stopped mechanical oil pump 30, if the electric oil pump motor rotation speed decreased amount $\Delta$Nm becomes equal to or greater than the rotation speed decreased amount determination value $\Delta$Nm_opoff defined in advance, the electric oil pump control means 84 stops the electric oil pump 32. Therefore, whether the electric oil pump 32 is stopped based on the load increase of the electric oil pump 32 can easily be determined by detecting a change in the rotation speed of the electric motor 36.

(A7) According to this embodiment, if the electric motor 36 is driven at the predetermined rotation speed Nmt, the electric oil pump control means 84 may consider that the load of the electric oil pump 32 is larger when the electric oil pump motor drive current Im is greater as depicted in FIG. 3. In this case, the load increase of the electric oil pump 32 can be replaced with the increase in the electric oil pump motor drive current Im to determine a stop of the electric oil pump 32 based on the load increase of the electric oil pump 32 and, thus, whether the electric oil pump 32 is stopped based on the load increase of the electric oil pump 32 can easily be determined by detecting the electric oil pump motor drive current Im.

(A8) According to this embodiment, when the electric motor 36 is driven at the predetermined rotation speed Nmt, after the start of driving of the stopped mechanical oil pump 30, if the electric oil pump motor drive current increased amount $\Delta$Im becomes equal to or greater than the drive current increased amount determination value $\Delta$Im_opoff defined in advance, the electric oil pump control means 84 may stop the electric oil pump 32. In this case, whether the electric oil pump 32 is stopped based on the load increase of the electric oil pump 32 can easily be determined by detecting a change in the electric oil pump motor drive current Im.

(A9) According to this embodiment, when the idling reduction control is canceled, the electric oil pump control means 84 stops the electric oil pump 32 based on the load increase of the electric oil pump 32 after the start of driving of the stopped mechanical oil pump 30. Therefore, when the idling reduction control is canceled, the pump overlap drive period can be shortened and, for example, the fuel efficiency of the vehicle 8 can be improved.

Another embodiment of the present invention will be described. In the following description of the embodiment, the mutually common portions of the examples will be denoted by the same reference numerals and will not be described.

Embodiment 2

In the description of this embodiment (second embodiment), differences from the first embodiment will mainly be described. A functional block diagram for explaining a main portion of the control function of an electronic control device 110 of this embodiment is FIG. 1, which is in common with the first embodiment; however, the electronic control device 110 includes an electric oil pump control means 112 instead of the electric oil pump control means 84 included in the electronic control device 62 of the first example. Therefore, the electronic control device 110 depicted in FIG. 1 includes the idling reduction condition determining means 80, the idling reduction control means 82, and the electric oil pump control means 112.

The electric oil pump control means 112 drives the electric motor 36 through the constant drive current control as is the case with the electric oil pump control means 84 of the first embodiment. However, the electric oil pump control means 112 is different from the electric oil pump control means 84 of the first embodiment in that the electric oil pump motor rotation speed Nm is used instead of the electric oil pump motor rotation speed decreased amount $\Delta$Nm for determining whether the electric oil pump 32 is stopped. The other points are the same as the electric oil pump control means 84.

Specifically, the electric oil pump control means 112 detects the electric oil pump motor rotation speed Nm so as to determine whether the electric oil pump 32 is stopped based on a load increase of the electric oil pump 32. When the idling reduction control is canceled, i.e., at the start of driving of the mechanical oil pump 30, the electric oil pump control means 112 determines whether the electric oil pump motor rotation speed Nm becomes equal to or less than a predefined electric motor rotation speed determination value Nm_opoff. After the start of driving of the stopped mechanical oil pump 30, if the electric oil pump control means 112 determines that the electric oil pump motor rotation speed Nm becomes equal to or less than the electric motor rotation speed determination value Nm_opoff, the electric oil pump control means 112 stops the electric oil pump 32.

Figure 9:
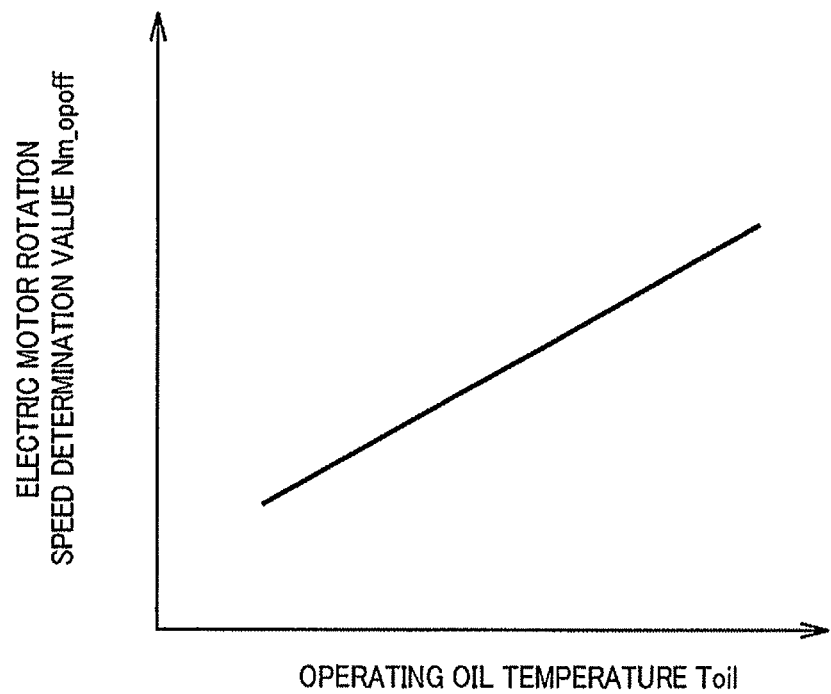
FIG. 9 is a diagram of a relationship empirically defined in advance between an operating oil temperature and the electric motor rotation speed determination value used for setting the electric motor rotation speed determination value based on the operating oil temperature by an electric oil pump control means and a diagram for explaining a second embodiment.

The electric motor rotation speed determination value Nm_opoff is empirically obtained and set in advance such that the pump overlap drive period is shortened at the start of driving of the mechanical oil pump 30 and that a temporary drop due to the switch between the driven oil pumps 30 and 32 can be suppressed in the supply oil pressure to the hydraulic control circuit 20. The electric motor rotation speed determination value Nm_opoff may be a constant value, for example; however, under the constant drive current control of the electric motor 36, when the oil temperature Toil of the operating oil sucked by the electric oil pump 32 (hereinafter referred to as operating oil temperature Toil) is lower, the viscosity of the operating oil is increased and makes the electric oil pump motor rotation speed Nm lower during steady operation, for example, and, therefore, the electric motor rotation speed determination value Nm_opoff is set lower by the electric oil pump control means 112 when the operating oil temperature Toil is lower from a relationship empirically set in advance as depicted in FIG. 9. Although the electric motor rotation speed determination value Nm_opoff may be set, for example, based on the operating oil temperature Toil at the start of the idling reduction control or may be set based on the operating oil temperature Toil at the time when the idling reduction execution condition being fulfilled is no longer fulfilled, the electric motor rotation speed determination value Nm_opoff is set at least while the mechanical oil pump output oil pressure Pmop is sufficiently low relative to the electric oil pump output oil pressure Peop. FIG. 9 is a diagram of a relationship empirically defined in advance between the operating oil temperature Toil and the electric motor rotation speed determination value Nm_opoff used for setting the electric motor rotation speed determination value Nm_opoff based on the operating oil temperature Toil.

FIG. 10 is a flowchart for explaining a main portion of the control function of the electronic control device 110, i.e., a control operation of driving or stopping the electric oil pump 32 in the constant drive current control. The control operation depicted in FIG. 10 is performed independently or concurrently with another control operation. Although SC1 to SC4, SC6, and SC8 of FIG. 10 are the same as SA1 to SA4, SA5, and SA7, respectively, of FIG. 4, SC5 is added to FIG. 10 as compared to FIG. 4 and SA6 of FIG. 4 is replaced with SC7. Therefore, SC5 and SC7 of the flowchart depicted in FIG. 10 will be described and the other steps will not be described.

In FIG. 10, after SC4, the operation goes to SC5. At SC5, the operating oil temperature Toil is detected and the electric motor rotation speed determination value Nm_opoff acting as an electric oil pump stop determination motor rotation speed is set based on the operating oil temperature Toil from the preset relationship as depicted in FIG. 9. After SC5, the operation goes to SC6.

In FIG. 10, after SC6, the operation goes to SC7. At SC7, it is determined whether the electric oil pump motor rotation speed Nm becomes equal to or less than the electric motor rotation speed determination value Nm_opoff. If the determination of SC7 is affirmative, i.e., if the electric oil pump motor rotation speed Nm becomes equal to or less than the electric motor rotation speed determination value Nm_opoff, the operation goes to SC8. On the other hand, if the determination of SC7 is negative, the operation goes to SC6. Therefore, until the electric oil pump motor rotation speed Nm becomes equal to or less than the electric motor rotation speed determination value Nm_opoff, the electric oil pump 32 is continuously driven at SC6. In FIG. 10, SC2 and SC5 to SC8 correspond to the electric oil pump control means 112.

This embodiment has the following effects (B1) and (B2) in addition to the effects (A1) to (A3), (A5), and (A9) of the first embodiment. (B1) According to this embodiment, when the electric motor 36 is driven by the predetermined drive current Imt, after the start of driving of the stopped mechanical oil pump 30, if the electric oil pump motor rotation speed Nm becomes equal to or less than the electric motor rotation speed determination value Nm_opoff defined in advance, the electric oil pump control means 112 stops the electric oil pump 32. Therefore, whether the electric oil pump 32 is stopped based on the load increase of the electric oil pump 32 can easily be determined by detecting the electric oil pump motor rotation speed Nm.

(B2) According to this embodiment, as depicted in FIG. 9, the electric motor rotation speed determination value Nm_opoff is set lower when the temperature Toil of the operating oil sucked by the electric oil pump 32 is lower. When the temperature Toil of the operating oil is lower, the viscosity of the operating oil is increased and the load of the electric oil pump 32 becomes larger regardless of the operation of the mechanical oil pump 30. Therefore, the viscosity characteristic of the operating oil can be reflected to the electric motor rotation speed determination value Nm_opoff to stop the electric oil pump 32 at proper timing corresponding to the operation state of the mechanical oil pump 30.

Although the embodiments of the present invention have been descried in detail with reference to the drawings, these embodiments merely represent an examples and the present invention may be implemented in variously modified and improved forms based on the knowledge of those skilled in the art.

For example, in the first and second embodiment, when the idling reduction control is canceled, the electric oil pump 32 is stopped based on a load increase of the electric oil pump 32; however, the electric oil pump 32 may be stopped based on the load increase of the electric oil pump 32 in other situations not limited to the time of cancelation of the idling reduction control.

Although the oil supply device 10 supplies an oil pressure causing the operation of a plurality of the friction engagement devices 15 engaged through the hydraulic control so as to shift the automatic transmission 14 in the first and second embodiment, the automatic transmission 14 may be replaced with a continuously variable transmission (CVT), for example, and the oil supply device 10 may be an oil pressure generation source for operating hydraulically-controlled friction engagement devices disposed in the continuously variable transmission or another power transmission mechanism such as a forward/backward drive switching device.

Although the vehicle 8 is a normal engine vehicle as depicted in FIG. 1 in the first and second embodiments, the vehicle 8 may be, for example, a hybrid vehicle having an electric motor as a drive power source for running along with the engine 12.

Although the oil supply destination of the mechanical oil pump 30 and the electric oil pump 32 is the hydraulic control circuit 20 in the first and second embodiments, the mechanical oil pump 30 and the electric oil pump 32 may supply oil to an oil supply destination other than the hydraulic control circuit 20 instead of the hydraulic control circuit 20 or in addition to the hydraulic control circuit 20. If the hydraulic control circuit 20 is not included in the oil supply destinations of the mechanical oil pump 30 and the electric oil pump 32, the vehicle 8 may not include the automatic transmission 14 and the hydraulic control circuit 20.

Although the electric oil pump 32 is rotationally driven by the electric motor 36 to output the oil pressure in the first and second embodiments, the oil pump may be an electromagnetic oil pump without the electric motor 36.

Although the oil supply device 10 acts as a vehicle oil pressure generation device in the first and second embodiments, the use thereof is not limited to generation of an oil pressure and, for example, the oil supply device 10 may act as a lubrication oil supply device supplying lubrication oil to an oil supply destination.

A plurality of the examples described above may be implemented in a mutually combined manner by setting priority, for example.

NOMENCLATURE OF ELEMENTS

- 10: oil supply device (vehicle oil supply device)
- 12: engine
- 20: hydraulic control circuit (oil supply destination)
- 30: mechanical oil pump
- 32: electric oil pump
- 50: discharge oil passage (oil passage)
- 52: discharge oil passage (oil passage)
- 56: check valve
- 58: discharge port
- 60: discharge port
- 62, 110: electronic control device (control device)

The invention claimed is:

1. A control device of a vehicle oil supply device having a mechanical oil pump driven by an engine to supply oil to an oil supply destination and an electric oil pump supplying oil via a check valve to the oil supply destination, the check valve making up a portion of an oil passage connecting a discharge port of the mechanical oil pump and a discharge port of the electric oil pump, the check valve allowing a flow of the oil from the electric oil pump side to the mechanical oil pump side while blocking a flow in a direction opposite to the flow, the oil discharged from the electric oil pump being a blocked in an oil passage connecting the electric oil pump and the check valve regardless of an output oil pressure of the electric oil pump, when the check valve is closed, the check valve being closed under an oil pressure condition in which the electric oil pump outputs a maximum output oil pressure of the electric oil pump while the mechanical oil pump is driven by the engine in an idling state, the control device being configured to drive the electric oil pump during stop of the mechanical oil pump, and to stop the electric oil pump based on a load increase of the electric oil pump after start of driving of the stopped mechanical oil pump.

2. The control device of a vehicle oil supply device of claim 1, wherein the load increase of the electric oil pump corresponds to a decrease in rotation speed of an electric motor when the electric motor driving the electric oil pump is driven by a predetermined drive current.

3. The control device of a vehicle oil supply device of claim 1, wherein the load increase of the electric oil pump corresponds to an increase in drive current of the electric motor when an electric motor driving the electric oil pump is driven at a predetermined rotation speed.

* * * * *